J. A. JONES.
COVER FOR AUTOMOBILE TOPS.
APPLICATION FILED AUG. 5, 1913.
1,142,329.
Patented June 8, 1915.
2 SHEETS—SHEET 1.
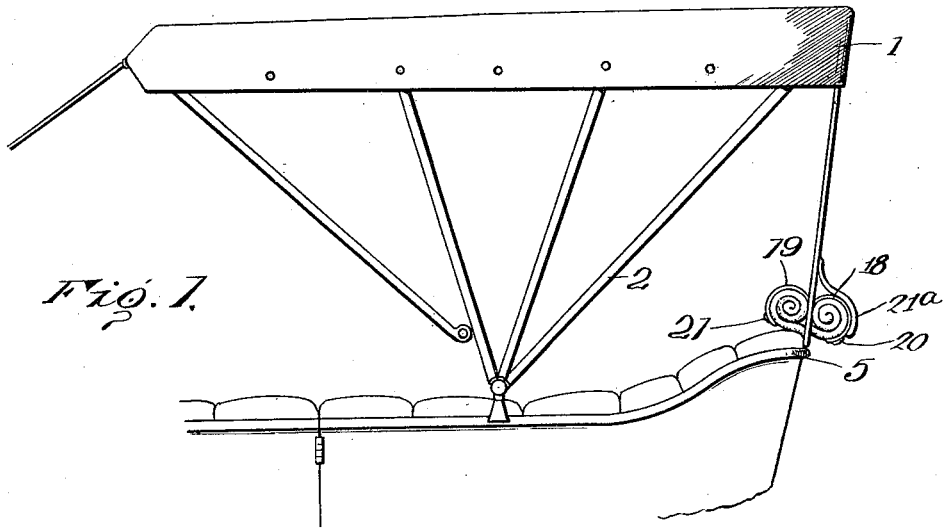
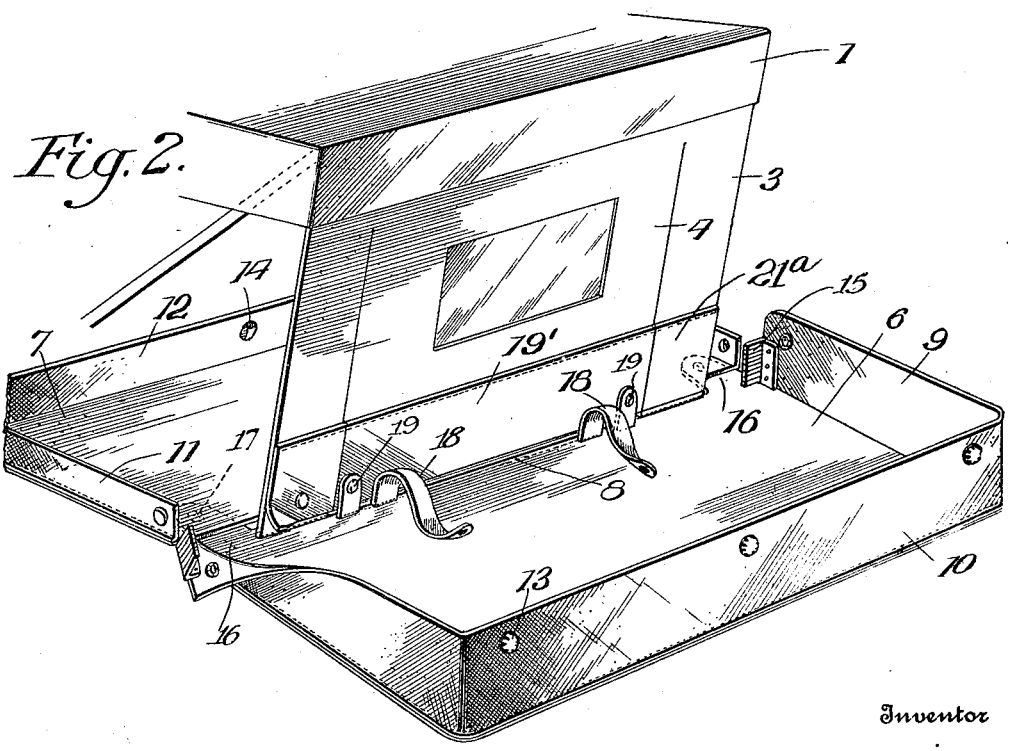
Inventor
J. A. Jones.

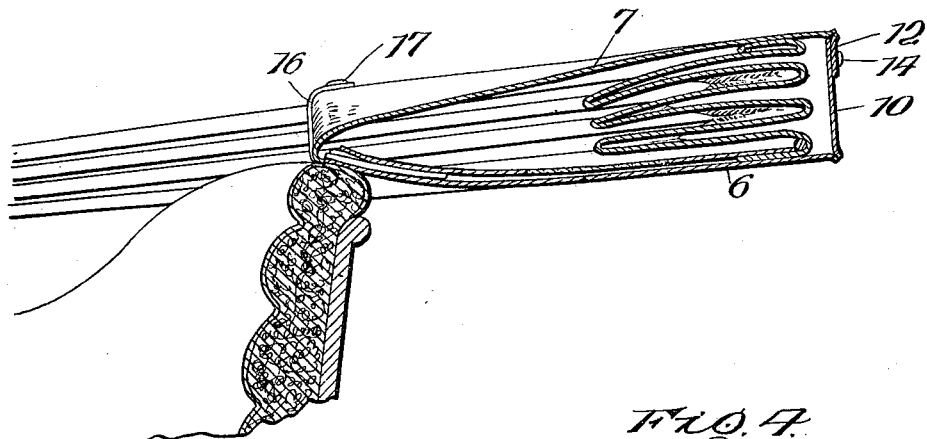
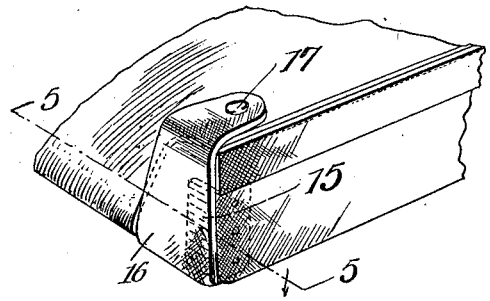
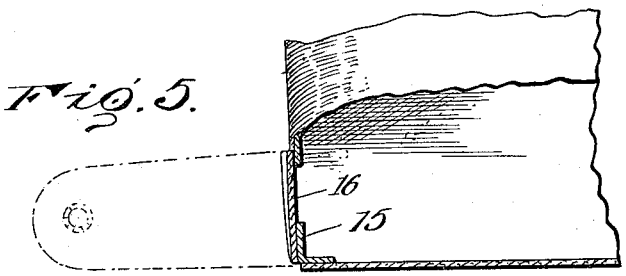

UNITED STATES PATENT OFFICE.

JAMES A. JONES, OF JACKSON, TENNESSEE.

COVER FOR AUTOMOBILE-TOPS.

1,142,329.  Specification of Letters Patent.  Patented June 8, 1915.

Application filed August 5, 1913. Serial No. 783,170.

*To all whom it may concern:*

Be it known that I, JAMES A. JONES, citizen of the United States, residing at Jackson, in the county of Madison and State of Tennessee, have invented certain new and useful Improvements in Covers for Automobile-Tops, of which the following is a specification.

This invention relates to covers for automobile tops, and has as its object to provide a cover which may be drawn to completely inclose and to protect the top when folded, and thereby prevent the same becoming covered with dust and dirt.

It is another aim of the invention to so construct the cover that it may be conveniently stored when the top is raised and the cover is not in use, the cover being so arranged that it may be readily unfolded and drawn over the top, when the top is folded and it is desired to protect the same.

The invention aims further to so construct the cover that it may be completely closed at its corners which inclose the inner corners of the folded top so that dust will be excluded.

In the accompanying drawings: Figure 1 is a side elevation of an automobile top provided with the cover embodying the present invention, the top being shown raised and the cover being shown folded or stored. Fig. 2 is a perspective view of the rear side of the top illustrating the cover for the top spread out and in condition prior to folding of the top. Fig. 3 is a vertical front to rear sectional view through the top in folding position and illustrating the manner in which the top is inclosed within the cover. Fig. 4 is a perspective view of one forward corner of the cover in closed condition. Fig. 5 is a sectional view on the line 5—5 of Fig. 4.

Corresponding and like parts are referred to in the following description and indicated in all views of the accompanying drawings by the same reference characters.

In the drawings the numeral 1 indicates the top in general and 2 the bows, the back stays and the rear curtain being indicated respectively by the numerals 3 and 4. The body of the automobile upon which the top is mounted is indicated in general at 5.

The cover embodying the present invention includes a back section 6 and a front section 7. The back section 6 is secured along its lower or forward edge as at 8, at the upper side of the back of the body 5 and the said section is provided with end portions 9 and an upper or back portion 10, which extends between the said end portions at the rear edge of the said section. In a like manner the front section 7 is secured at its rear edge at the line of attachment of the edge 8 of the back section and is provided with end portions 11 and a connecting forward portion 12, which extends at the forward edge of the said section 7. For a purpose to be presently explained, the end portions 9 and back portion 10 of the section 6 are provided adjacent their free edges with a number of stud members 13 constituting elements of snap fastening devices of which the socket members, indicated at 14, are secured at corresponding points along the end portions 11 and forward portion 12 of the section 7.

By reference to Fig. 3 of the drawings, it will be observed that when the cover is drawn over the folded top, the portions 11 and 12 of the forward section 7 will overlap the portions 9 and 10 respectively of the rear section 6, the socket members 14 being engaged with the studs 13, whereby to hold the portions in connected relation. By reference to the said figure and Fig. 2 of the drawings, it will be understood that the space between the bows at the front of the folded top is closed by the attached forward and rear edges respectively of the sections 6 and 7 and that the side and end portions of these sections being connected or united by snap fastening devices, serve to completely close the cover about the folded top. At this point it will be apparent that any suitable fastening means may be employed other than snap fastening devices, such as, for example, straps and buttons, and the like.

In order that the forward corners of the cover for the top may be completely closed about the bows so as to exclude dust, each side portion 9 is provided with a number of strips 15 located at its forward end, and the forward edge of the section 6 is provided at each end with a closure flap 16 provided with one member 17 of a fastening device. In closing the cover about the top, the strips 15 are positioned so as to lie within the cover in the manner shown in Fig. 5 of the drawings, and the closure flaps 16 are then folded in the manner shown in Figs. 4 and 5, so as to close the forward corners of the cover, and the ends of these flaps are fastened over the outer side of the section 7.

From the foregoing, it will be seen that when the top is folded, it may be completely housed within the cover and as a consequence, there will be no likelihood of dust settling upon the top. In order that the front and rear sections of the cover may be conveniently stored when not in use, straps 18 and 19 are secured at the line of attachment of the body sheets of the sections 6 and 7 and when it is desired to store the said sections of the cover, their end and rear and front portions respectively are folded down upon the inner sides of their body sheets and the sections are then rolled in the manner shown in Fig. 1 of the drawings. After being compactly rolled, the straps 18 and 19 are drawn over them and buttoned at their ends over buttons 20 and 21 respectively, these buttons being secured to the body sheets of the sections. When so stored, the section 6 will be in a compact roll extending behind the back curtain and back stays of the top 1, and the section 7 will occupy a like position in front of the said curtain and stays.

From the foregoing description of the invention, it will be seen that the cover may be conveniently stored when not in use and that when the top has been folded down and it is desired to employ the cover to protect the top, the cover may be quickly and readily unrolled and drawn about the top and secured in place.

In order that the cover when not in use and when in rolled up condition as shown in Fig. 1 of the drawings, may be protected from the rain, a cover flap 19′ is secured at its upper edge to the back curtain 4 and other flaps 21ᵃ are secured at their upper edges to the back stays 3 and these flaps are to be stretched over the rolled up back of the cover in the manner shown in Fig. 1 of the drawings and secured by any suitable fastening means.

Having thus described the invention what is claimed as new is:

1. In a cover for vehicle tops, flexible foldable cover sections attached at their adjacent edges and arranged to receive between them in folded condition the top to be protected, and means separably connecting the sections at their marginal portions, and means for holding the sections in folded condition.

2. The combination with a vehicle top, of a cover therefor including flexible foldable sections connected at the lower portion of the back of the top and lying one in front and the other in rear of the said back of the top, the said sections being provided with overlapping side portions separably connected, and means for holding the sections in folded condition.

3. The combination with a vehicle top, of a cover therefor including flexible foldable sections connected at the lower portion of the back of the top and lying one in front and the other in rear of the said back of the top, the said sections being provided with overlapping side portions separably connected, and the side portions of one of the sections at their inner ends being provided with closure flaps adapted to lie within the cover when the cover is closed, and means for holding the sections in folded condition.

4. The combination with a vehicle top, of a cover therefor including sections connected at the lower portion of the back of the top and lying one in front and the other in rear of the said back of the top, the said sections being provided with overlapping side portions separably connected, and the side portions of one of the sections at their inner ends being provided with closure flaps adapted to lie within the cover when the cover is closed, and the said section at its connected marginal portion being provided with other closure flaps adapted to be separably connected to the body portion of the other section.

5. The combination with a vehicle top, of a cover for the top comprising sections connected at the lower side of the back of the top and having side portions to inclose the sides of the top when folded, the sections being adapted to be rolled and stored one at the front and the other at the rear of the said back of the top, and straps connected at their ends at the attached edges of the sections and adapted to be secured around the sections when the sections are folded.

In testimony whereof I affix my signature in presence of two witnesses.

JAMES A. JONES. [L. S.]

Witnesses:
PRENTICE W. COLE,
C. B. GAINS.